Figure 1:
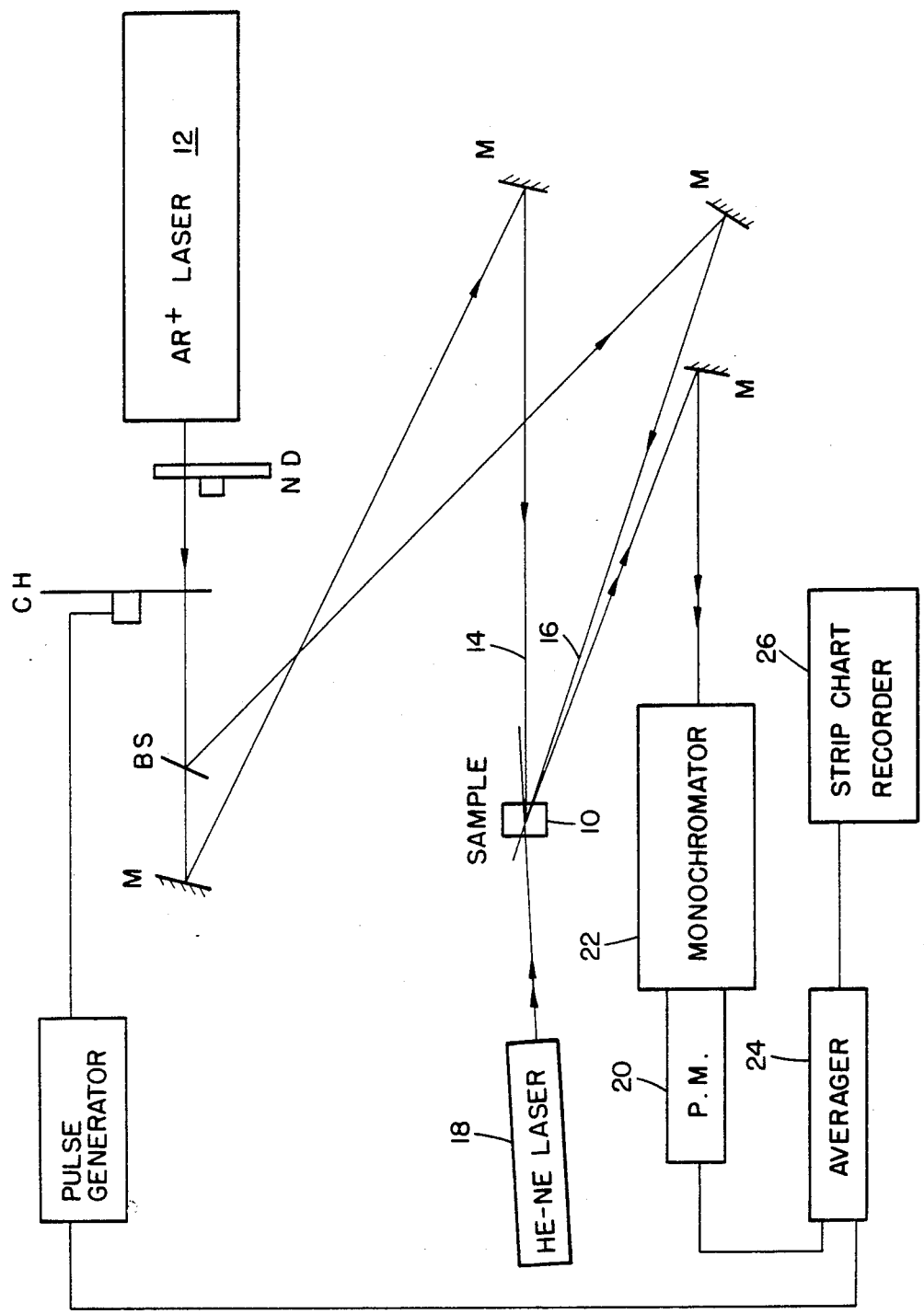

United States Patent [19]

Powell et al.

[11] Patent Number: 4,728,165
[45] Date of Patent: Mar. 1, 1988

[54] SUPERIMPOSED FAST TRANSIENT AND PERMANENT HOLOGRAPHIC GRATINGS

[75] Inventors: Richard C. Powell; Edward G. Behrens; Frederic M. Durville, all of Stillwater, Okla.

[73] Assignee: Research Corporation, N.Y.

[21] Appl. No.: 927,892

[22] Filed: Nov. 5, 1986

[51] Int. Cl.⁴ .......................... G03H 1/02; G03C 1/72
[52] U.S. Cl. .................. 350/364; 350/162.2; 350/320; 430/2
[58] Field of Search ....................... 350/320, 3.61–3.64, 350/162.2; 430/1, 2

[56] References Cited

U.S. PATENT DOCUMENTS

| | | | |
|---|---|---|---|
| 3,594,167 | 7/1971 | Laming et al. | 430/3.61 |
| 3,625,583 | 12/1971 | Fan | 350/3.62 |
| 3,671,096 | 6/1972 | Mackin | 430/3.61 |
| 3,937,554 | 2/1976 | Tsunoda et al. | 350/3.61 |
| 3,940,748 | 2/1976 | Carson | 350/3.64 |
| 4,433,893 | 2/1984 | Yokota et al. | 350/3.61 |

Primary Examiner—Bruce Y. Arnold
Attorney, Agent, or Firm—Scully, Scott, Murphy & Presser

[57] ABSTRACT

A method is disclosed for producing a superimposed fast transient grating on a permanent holographic grating which provides high scattering ability, fast modulation response times, and the capability of writing and erasing signals therein. A glass host is doped with trivalent rare earth ions, and is then placed in the crossed field of two coherent radiation beams to resonantly pump the trivalent rare earth ions at a frequency in resonance with one of the absorption transitions thereof. This produces two types of laser induced gratings, a transient population grating associated with the excited rare earth ions, and a permanent holographic grating associated with a structural modification of the glass host. The superposition of these gratings result in a four wave mixing signal with enhanced strength and the capability of amplitude or frequency modulation. These superimposed gratings have applications involving phase conjugation and other types of optical signal processing and also provide a new method for probing the local structural properties of amorphous materials.

10 Claims, 6 Drawing Figures

SUPERIMPOSED FAST TRANSIENT AND PERMANENT HOLOGRAPHIC GRATINGS

BACKGROUND OF THE INVENTION

1. Field of the Invention

The present invention relates generally to laser-induced refractive index gratings, and more particularly pertains to superimposed fast transient and permanent holographic gratings, and techniques for producing such superimposed gratings.

2. Discussion of the Prior Art

Light scattering from laser-induced refractive index gratings in materials is the physical mechanism underlying many techniques for controlling light beams in devices useful in a variety of opto-electric technology applications. Examples include phase conjugators, holographic information storage, beam switching and amplification, and intracavity modulation of lasers. Currently known laser-induced grating devices are one of two types, materials producing permanent holographic gratings, and materials producing fast transient gratings. Permanent holographic gratings have high light scattering efficiencies but slow response times, while fast transient gratings have low scattering efficiencies but fast response times.

Moreover, Four Wave Mixing (FWM) processes are currently of significant interest in science and technology because of their importance in modern optical applications such as phase conjugation, and also because they provide a powerful spectroscopic tool for probing the properties of the interaction of light and matter.

The physical processes underlying the laser-induced gratings that give rise to FWM signals can be classified in two categories according to their decay times after the laser writing beams have been turned off. The first category is that of transient gratings with fast decay times, which includes thermal gratings, population gratings, and nonlinear mixing due to third order susceptibility. The second category is permanent gratings which remain in a relatively permanent state after the laser writing beams have been turned off. The most common cause of this type of grating is the photorefractive effect involving ionization of a defect, charge migration and charge trapping. Permanent gratings are also referred to as holographic gratings because of their potential use in holographic information storage applications.

However, the prior art generally discloses and teaches gratings which are only transient gratings, and gratings which are only permanent holographic gratings, with each having its own attendant advantages and disadvantages, and has not heretofore disclosed a device which simultaneously provides a superposition of both types of gratings. Moreover, the prior art has generally provided permanent holographic gratings in a variety of crystalline host materials such as lithium niobate, but has not heretofore produced permanent holographic gratings in a glass host, except amorphous semiconductor films called chalcogenide glasses.

SUMMARY OF THE INVENTION

Accordingly, it is a primary object of the present invention to provide superimposed fast transient and permanent holographic gratings having both high scattering efficiency and the capability of fast modulation response times.

A further object of the subject invention is the provision of superimposed fast transient and permanent holographic gratings which significantly enhance the signal strength normally available from transient gratings while still providing a fast response time therefrom.

An additional object of the subject invention is the production of holographic gratings which are erasable, and can also be produced to have transient modulation written therein. The resultant holographic gratings produced by the present invention are relatively permanent, but can be photo-erased by a single erasing laser beam or can be thermally erased by raising the temperature thereof.

In accordance with the teachings herein, the present invention provides a method of producing a superimposed fast transient grating on a permanent holographic grating which provides high scattering ability, fast modulation response times, and the capability of writing and erasing signals therein, in which a glass host is doped with trivalent rare earth ions, and is placed in the crossed field of two coherent radiation beams to resonantly pump the trivalent rare earth ions at a frequency in resonance with one of the absorption transitions thereof.

The present invention has been proven to provide an arrangement for producing fast transient gratings superimposed on permanent holographic gratings in several types of oxide glasses doped with rare earth ions, particularly $Eu^{3+}$ ions in lithium phosphate, lithium silicate, and pentaphosphate glasses.

The present invention is believed to operate by providing a glass host having high frequency vibrational modes coupled to the localized vibrational modes of the rare earth ions. In view thereof, the teachings of the present invention are believed to be applicable to a wide variety of different types of glass hosts doped with trivalent rare earth ions including praseodymium ($^{59}Pr$), neodymium ($^{60}Nd$), promethium ($^{61}Pm$), samarium ($^{62}Sm$), europium ($^{63}Eu$), terbium ($^{65}Tb$), dysprosium ($^{66}Dy$), holmium ($^{67}HO$), erbium ($^{68}Er$), and thulium ($^{69}Tm$).

The combined gratings are produced by crossing two coherent laser beams in the sample at room temperature or below, at a frequency in resonance with one of the rare earth absorption transitions. The superimposed gratings are produced while the radiation beams are on, and after the beams are cut off, the fast transient grating disappear, leaving only the permanent holographic grating in the glass host, with any information which is written therein. Thus, the present invention also provides permanent holographic gratings in glass hosts, which may or may not have information modulated therein.

The superposition of transient and holographic gratings in doped glasses is technically significant as it presgrating decay time is the same as the fluorescence decay time of the rare earth ions.

Figure 2:
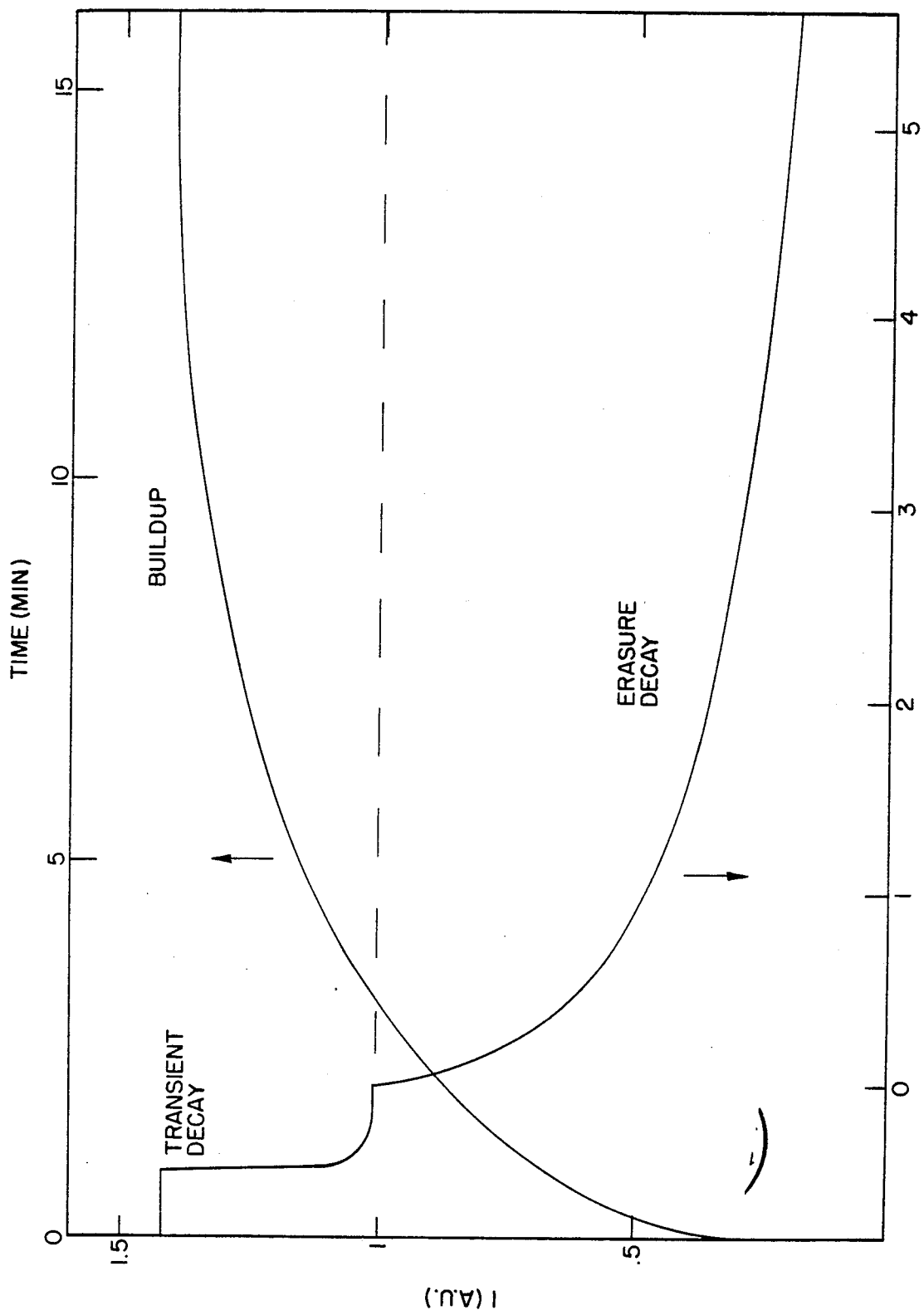

In greater detail, FIG. 2 illustrates the time dependencies of the buildup and decay of the FWM signal in $EuP_5O_{14}$ glass at room temperature. The time to reach the maximum FWM signal intensity is of the order of tens of minutes with the exact time depending on the laser power and wavelength. It is important that the laser wavelength be in resonance with a $Eu^{3+}$ absorption transition. This is consistent with the small values of the third order susceptibility tensor components measured by other prior art techniques, and demonstrates that a significant enhancement of the nonlinear optical properties of the material can be realized by resonantly pumping a rare earth ion absorption transition When the writing beams are terminated, the FWM signal decays expontentially with a decay time of 2.6 ms, independent of the grating spacing. This is the same as the fluorescence decay time of 2.7 ms measured for the transitions from the $^5D_0$ metastable state of $Eu^{3+}$ in this sample. However, the signal does not decay back to zero but rather to a constant level representing about 70% of the maximum signal.

The permanent FWM signal remains at the same high level for substantial periods of time, and has been verified experimentally for several days, and is believed substantially permanent. It can be erased by focusing a single laser beam on the same region of the sample in resonance with a $Eu^{3+}$ absorption transition. The erasure time is of the order of minutes, with the exact time depending on laser power and temperature and being independent of the writing beams crossing angle.

As illustrated by FIG. 2, the time dependence of the permanent signal erasure is highly nonexponential. However, a characteristic decay time equal to the $e^{-1}$ value for the signal can be defined to describe the speed of the erasure under specific experimental conditions.

Figure 3:
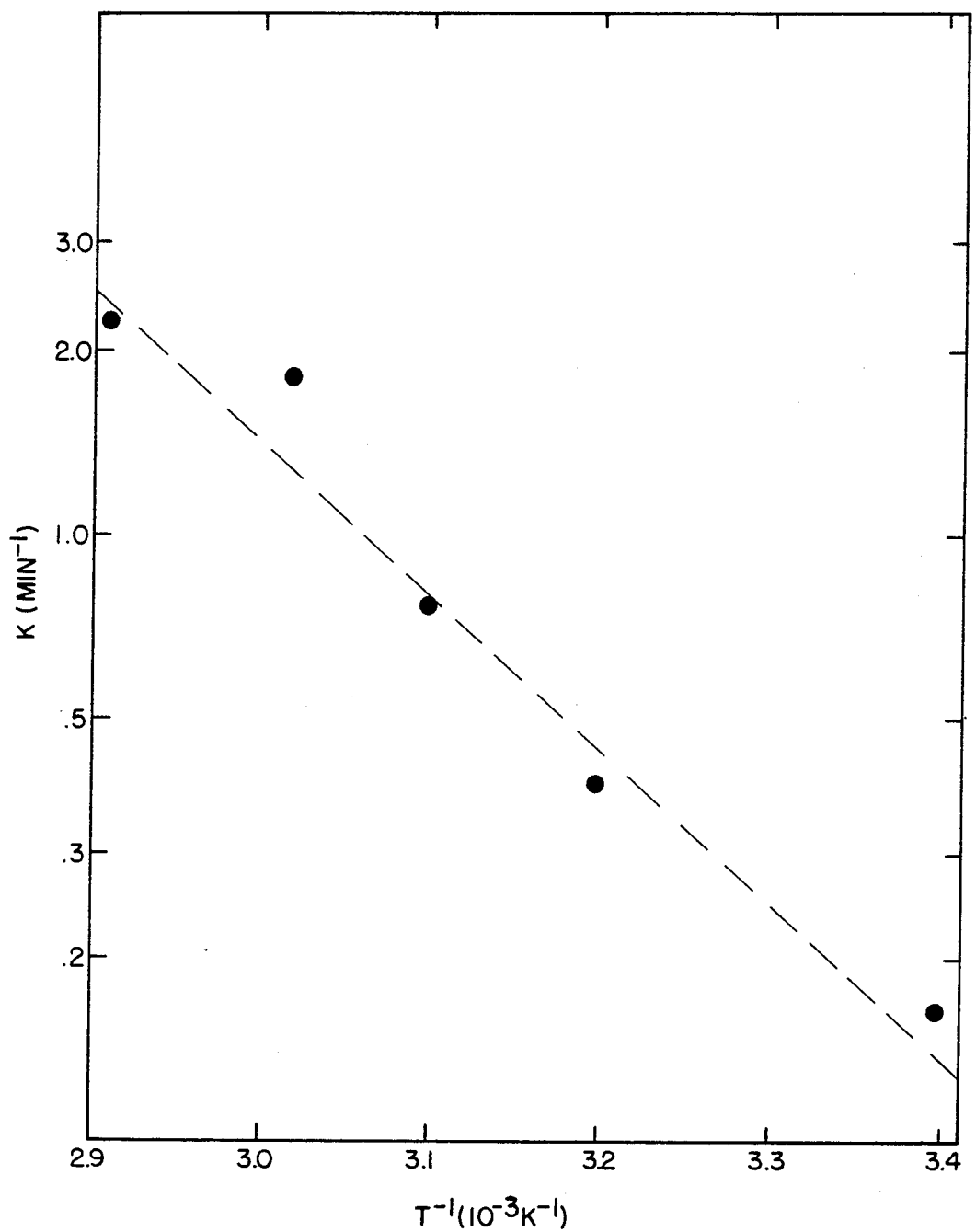

FIG. 3 illustrates the temperature dependence of the holographic grating erasure decay rate in EPP glass for an erase beam power of 40 mW. More specifically FIG. 3 illustrates the variation of the erasure decay rate versus temperature in the range 294 to 345 K. The erasure decay rate increases exponentially as the temperature is raised. This dependence can be described by an expression of the formula $$K \propto EXP[-\Delta E/k_B T] \quad (1)$$

where $\Delta E$ is the activation energy for the process and $k_B$ is Boltzmann's constant. The slope of the curve in FIG. 3 gives an activation energy of 3,720 cm$^{-1}$ for this case. Furthermore, the intensity of the FWM signal decreases as the temperature is raised above room temperature, and the permanent grating can be thermally erased by heating the sample to about 380° K. The temperature dependence of the scattering efficiency is consistent with a thermal activation energy of about 2,286 cm$^{-1}$.

Figure 4:
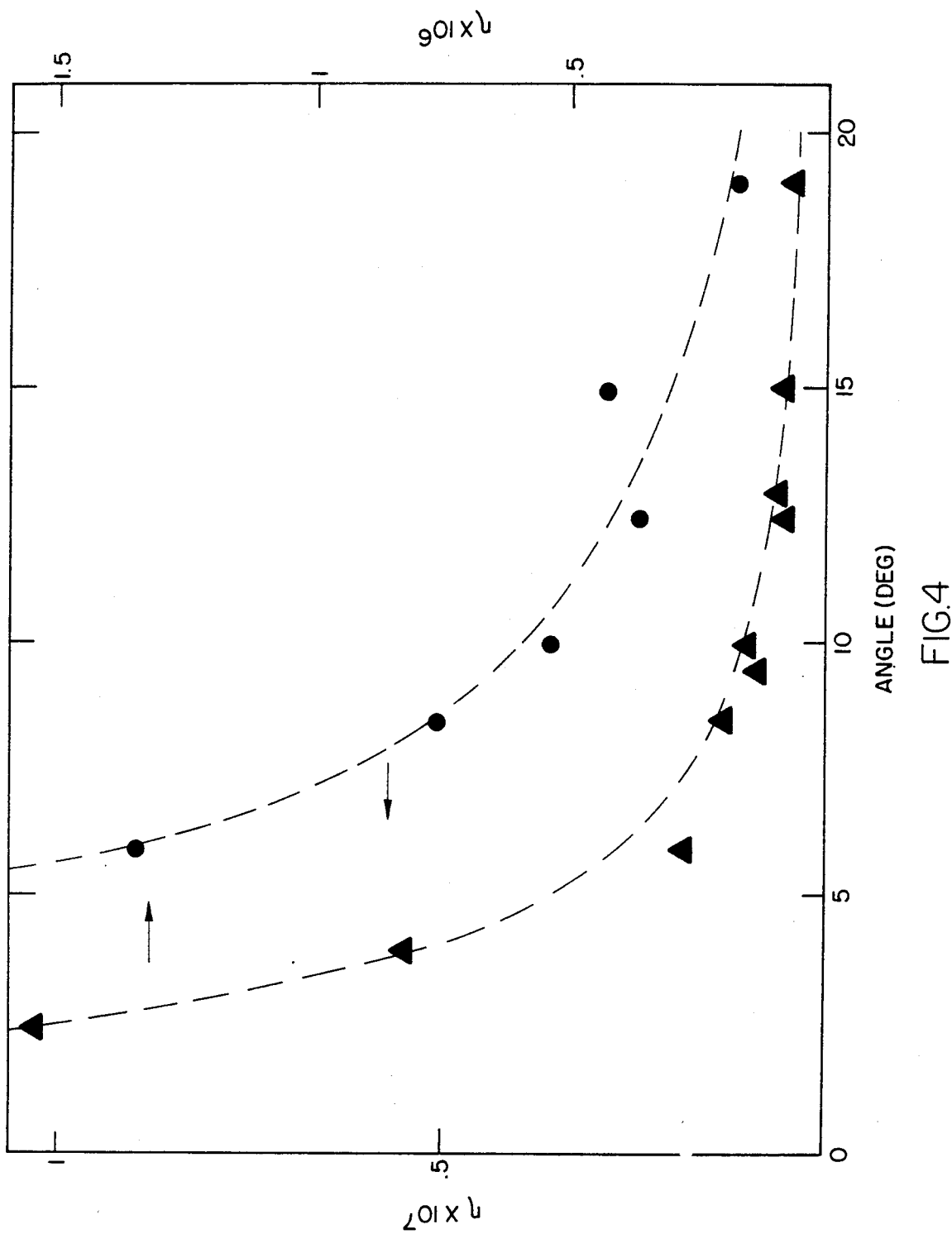

FIG. 4 shows the dependence of FWM scattering efficiency for EPP glass on the crossing angle of the write beams at 300 K, in which the triangles represent the scattering efficiency from the holographic grating and the circles represent the scattering efficiency from the transient grating. The signal intensity, expressed in term of the scattering efficiency of the probe beam $\eta$, also varies with the crossing angle of the write beams as shown in FIG. 4. For both the permanent and transient signals, the scattering efficiency is largest at small crossing angles. This is typical behavior for FWM signals with the exact form of the curve depending on the coupling mechanism for the beam. The dashed lines in FIG. 4 represent best fits to the data points since the physical mechanism providing the beam coupling in this case is not well enough understood to allow true theoretical predictions to be developed.

The results presented herein illustrate that resonant excitation of $Eu^{3+}$ ions in this glass host results in a transient population grating of the $Eu^{3+}$ ions in the $^5D_0$ metastable state and a permanent grating associated with local structural modifications of the glass host. The FWM signal is proportional to the square of the effective electric field induced in the material by the crossed laser beams. This can be expressed as the sum of the induced fields due to the population grating and the host grating, $E_{eff} \propto E_{pop} + E_{host}$. Since the first term decays with the fluorescence decay time of the $^5D_0$ level, $\tau$, and the second term is a constant, the time dependence of the signal when the write beams are turned off is given by $$I_{sig} \propto E^2_{pop} e^{2t/\tau} + 2E_{pop}E_{host}e^{t/\tau} + E^2_{host}. \quad (2)$$

For this case the first term is much smaller than the last two and can be neglected as a practical matter. Equation (2) then predicts a signal that decays with the $Eu^{3+}$ fluoresence decay time down to a constant value proportional to $E^2$host which is precisely the observed dependence shown in FIG. 2. Note that in the absence of the permanent grating, the signal due to the transient population grating will decay as $e^{2t/\tau}$ as observed in other resonantly pumped doped materials.

Figure 5:
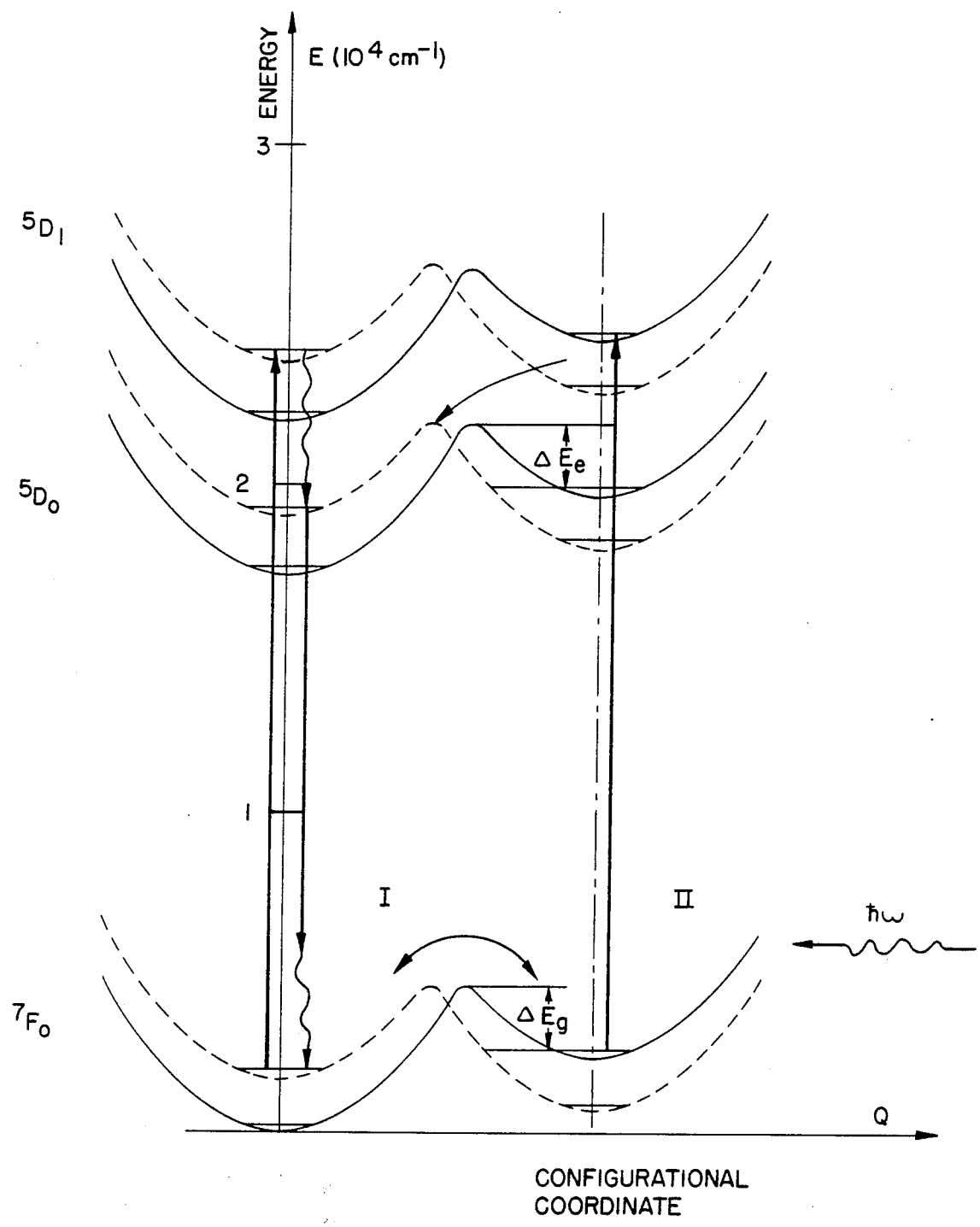
Figure 6:
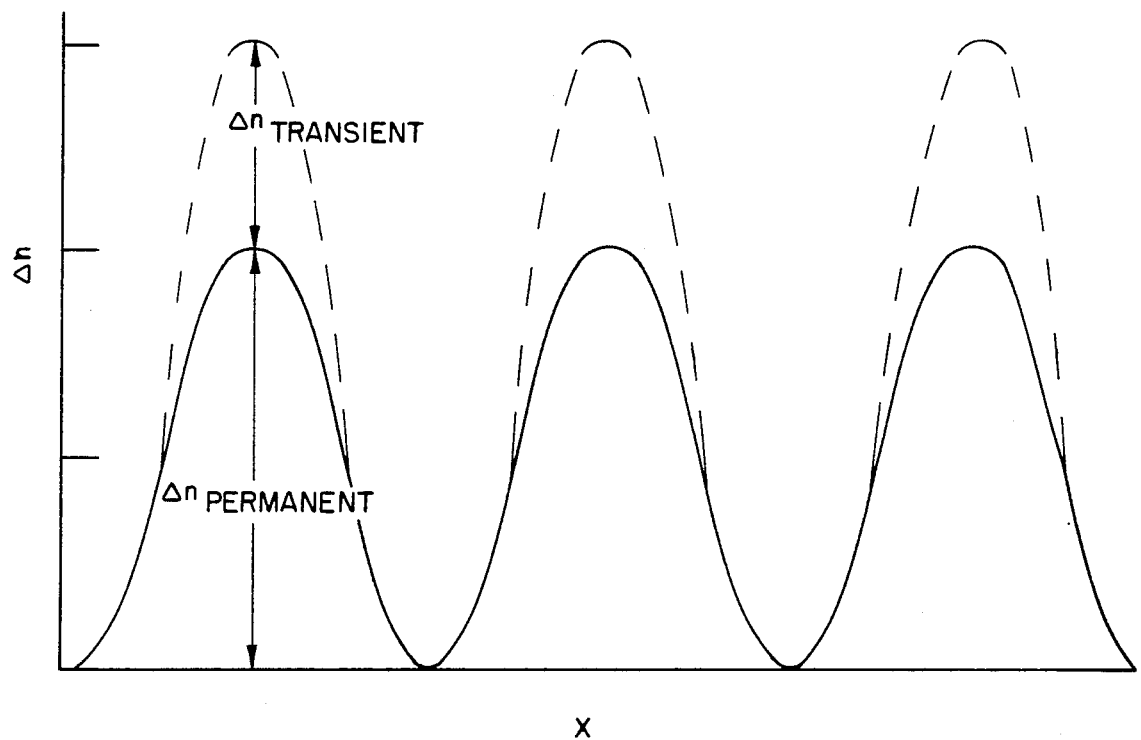

An important consideration concerns the physical mechanism producing the laser induced modification of the glass host giving rise to the permanent grating. Laser-induced refractive index changes in glasses have been observed for different types of glasses under different experimental conditions, but the previous results do not explain the results described herein. Tests have demonstrated that no permanent grating is established unless the $Eu^{3+}$ ions are directly excited with two crossed laser beams. The results observed thus far on the properties of the FWM signal strength and erasure rate for different glass samples, temperatures, and excitation conditions tend to eliminate mechanisms such as photoionization, bond rearrangements associated with trapped exciton effects, and thermally activated conformation changes, and indicates more specifically the mechanism shown schematically by a configuration coordinate diagram in FIG. 5. FIG. 5 illustrates configuration coordinate diagrams for the energy levels of two $Eu^{3+}$ ions in EPP glass with two possible local configurations. The transitions depict schematically the generation of high energy phonons from radiationless relaxation of an excited $Eu^{3+}$ ion, the change in local duction of a holographic "carrier" grating that can be amplitude modulated by a transient grating.

The results of the present invention have been produced in two different types of phosphate and one silicate glass, all doped with $Eu^{3+}$. The results have not been produced in Eu-doped borate, germanate, and fluoride glasses which have been tested, and the reason for this is not clear at the present time.

The unique method for producing these gratings is through resonant excitation of the rare earth ions. Although the exact mechanism for producing the refractive index change on the atomic scale is still not fully understood, it is believed to be associated with the generation of local modes of vibration through radiationless relaxation of the excited rare earth ions. These vibrational modes can cause local structural changes and experimental evidence supports this model.

While several embodiments and variations of the present invention for superimposed fast transient and permanent holographic gratings, and techniques for their production, are described in detail herein, it should be apparent that the disclosure and teachings of the present invention will suggest many alternative designs to those skilled in the art.

What is claimed is:

1. A method of producing a superimposed fast transient grating on a permanent holographic grating which provides high scattering ability, fast modulation response times, and the capability of writing and erasing signals therein, comprising doping a glass host with trivalent rare earth ions, and placing the doped glass host in the crossed field of two coherent radiation beams to resonantly pump the trivalent rare earth ions at a frequency in resonance with one of the absorption transitions of the rare earth ions.

2. A method of producing a superimposed fast transient grating on a permanent holographic grating as claimed in claim 1, including doping an oxide glass with $Eu^{3+}$ ions 3. A method of producing a superimposed fast transient grating on a permanent holographic grating as claimed in claim 2, including doping a lithium phosphate glass with $Eu^{3+}$ ions.

4. A method of producing a superimposed fast transient grating on a permanent holographic grating as claimed in claim 2, including doping a lithium silicate glass with $Eu^{3+}$ ions.

5. A method of producing a superimposed fast transient grating on a permanent holographic grating as claimed in claim 2, including doping a pentaphosphate glass with $Eu^{3+}$ ions.

6. A permanent holographic grating provided in a glass host doped with trivalent rare earth ions produced pursuant to the method of claim 1.

7. A permanent holographic grating provided in an oxide glass doped with $Eu^{3+}$ ions produced pursuant to the method of claim 2.

8. A permanent holographic grating provided in a lithium phosphate glass doped with $Eu^{3+}$ ions produced pursuant to the method of claim 3.

9. A permanent holographic grating provided in a lithium silicate glass doped with $Eu^{3+}$ ions produced pursuant to the method of claim 4.

10. A permanent holographic grating provided in a pentaphosphate glass doped with $Eu^{3+}$ ions produced pursuant to the method of claim 5.

* * * * *